United States Patent [19]

Maddox et al.

[11] 4,171,280

[45] Oct. 16, 1979

[54] POWDER PERCARBONATE BLEACH AND FORMATION THEREOF

[75] Inventors: Lodric L. Maddox, Oakland; Soo-Duck P. Moon, Fullerton, both of Calif.

[73] Assignee: The Clorox Company, Oakland, Calif.

[21] Appl. No.: 886,662

[22] Filed: Mar. 14, 1978

Related U.S. Application Data

[63] Continuation-in-part of Ser. No. 848,216, Nov. 3, 1977, abandoned.

[51] Int. Cl.$^2$ .................. C11D 3/395; C11D 7/18; C11D 7/54
[52] U.S. Cl. .................. 252/186; 8/111; 252/95; 252/99; 423/272; 423/273; 423/415 P
[58] Field of Search ............... 252/186, 95, 99; 8/111, 8/107; 423/272, 273, 415 P

[56] References Cited

U.S. PATENT DOCUMENTS

| 1,986,672 | 1/1935 | Bergman | 423/272 |
| 3,677,697 | 1/1972 | Yanush | 423/415 P |
| 3,979,318 | 9/1976 | Tokiwa et al. | 260/610 A |
| 4,075,116 | 2/1978 | Mesaros | 252/186 |

FOREIGN PATENT DOCUMENTS

50-27824 9/1975 Japan ................. 423/415 P

Primary Examiner—Benjamin R. Padgett
Assistant Examiner—Irwin Gluck
Attorney, Agent, or Firm—Phillips, Moore, Weissenberger, Lempio & Majestic

[57] ABSTRACT

The invention relates to a powder bleach composition comprising a plurality of particles wherein substantially each of the particles comprises soda ash and sufficient sodium percarbonate to provide about 1 to 6 weight percent available oxygen content. The bleach composition is made by contacting particulate soda ash, either anhydrous sodium carbonate or sodium carbonate monohydrate, with sufficient of a spray of an aqueous solution of hydrogen peroxide, the contacting being at a temperature from about 35° C. to about 70° C. to provide the aforedescribed bleach composition. The powder bleach composition is recovered from the contacting step once sufficient reaction has occurred to provide sufficient sodium percarbonate so that the bleach composition has from about 1 to about 6 weight percent available oxygen and a remainder which comprises soda ash and minor additives.

33 Claims, 4 Drawing Figures

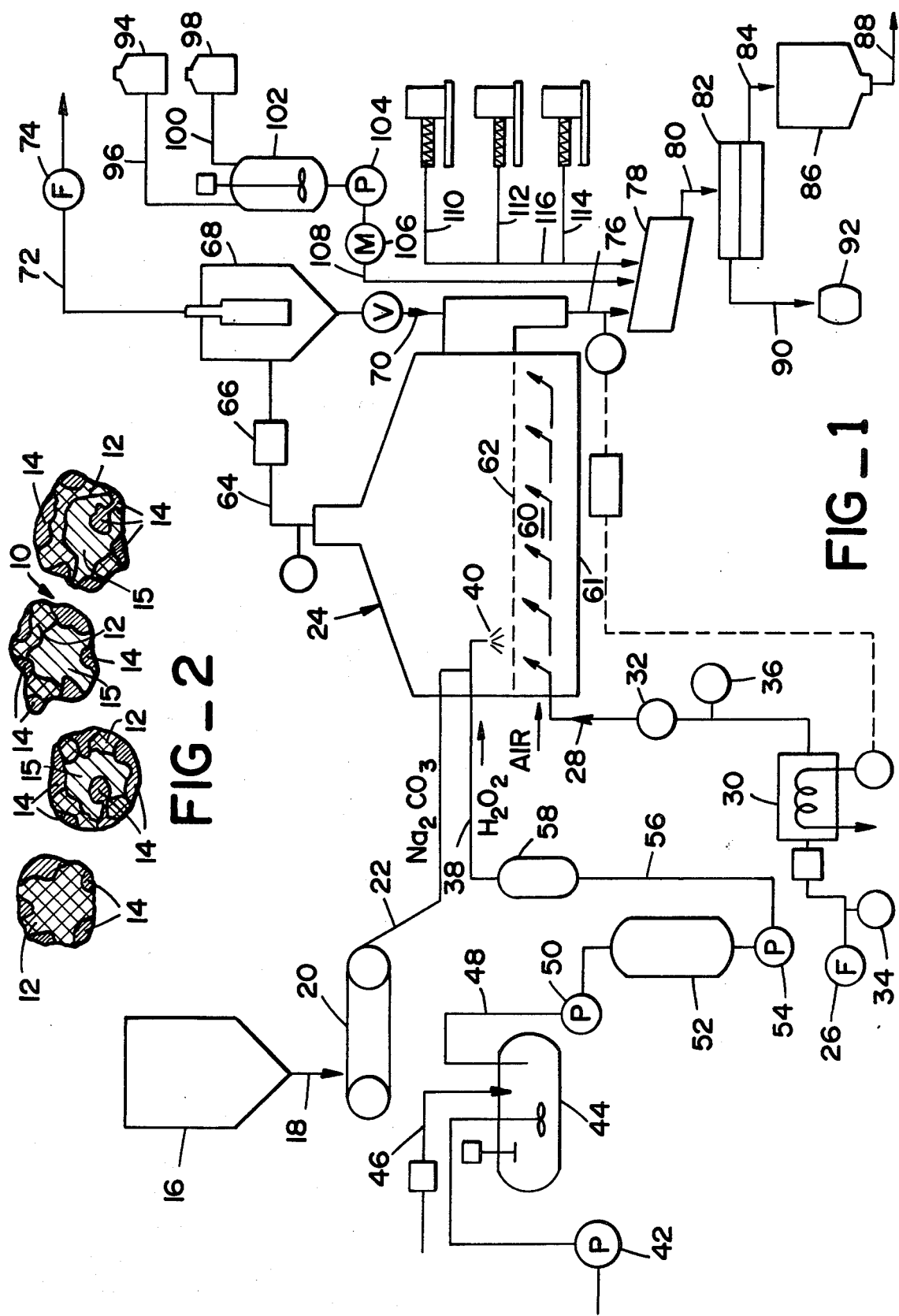

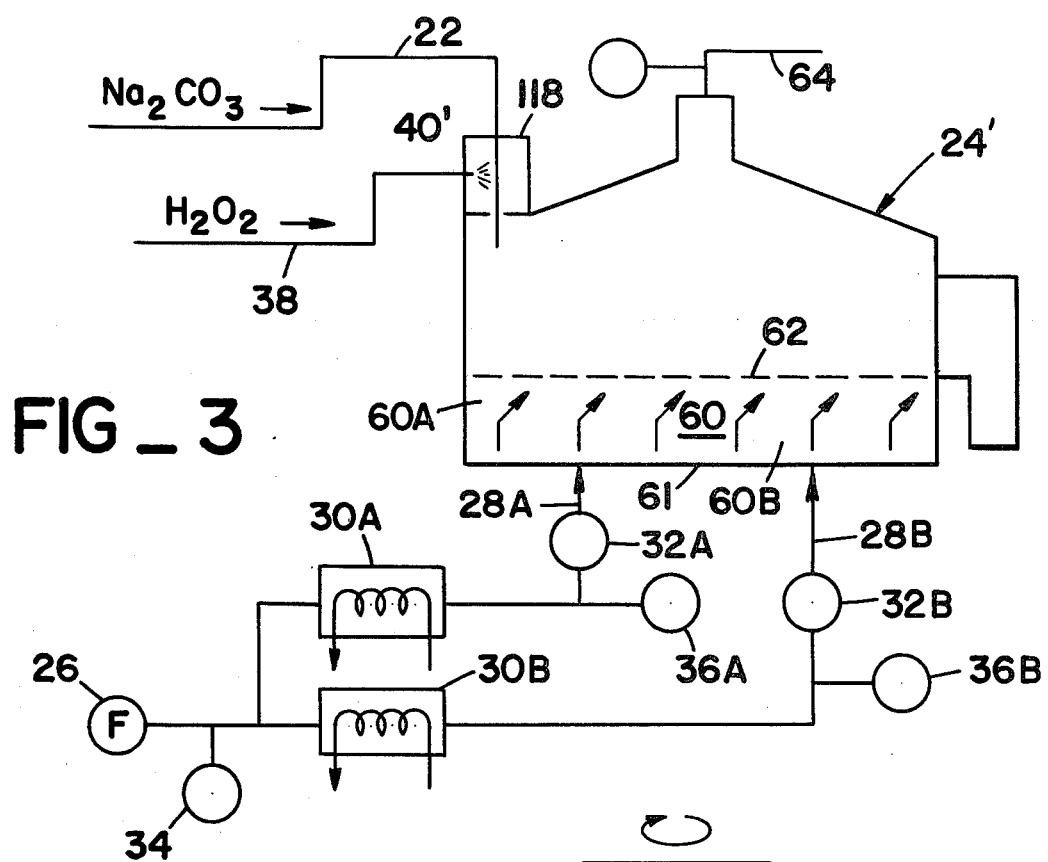
FIG_3
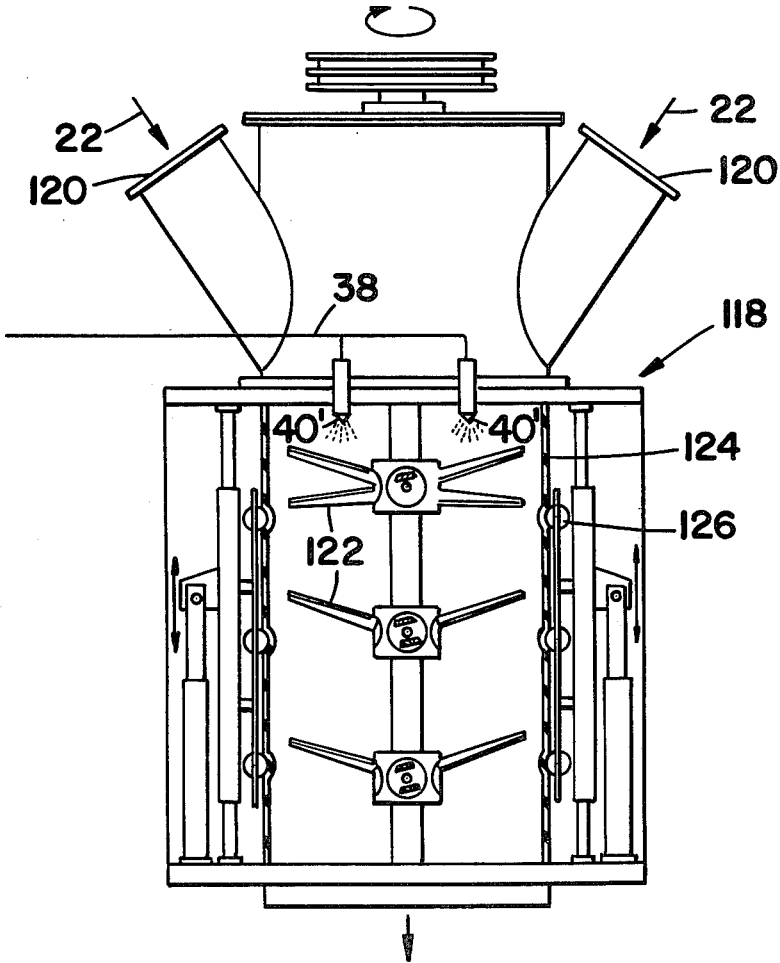
FIG_4

POWDER PERCARBONATE BLEACH AND FORMATION THEREOF

CROSS-REFERENCE

This application is a continuation-in-part of copending application Ser. No. 848,216, filed Nov. 3, 1977, now abandoned and commonly assigned herewith.

BACKGROUND OF THE INVENTION

1. Field of the Invention

The invention is concerned with powder peroxide bleach compositions and their formation. More particularly the invention is concerned with powder percarbonate bleach compositions which exhibit relatively long term stability and which retain integrity of composition from the top to the bottom of a box filled therewith.

2. Prior Art

Powder bleach compositions are of course very well known to the prior art. In these compositions attempts have been made to utilize commercial grades of percarbonate having about 10% to 15% available oxygen to provide at least a portion of the available oxygen therein. However, because of the relatively low stability of the percarbonate compounds of the prior art it has generally been necessary to use another peroxide compound, for example sodium perborate or the like in the powder bleach composition to assure that it maintains at least adequate available oxygen level after long term storage. The use of sodium perborate in a bleach composition along with sufficient soda ash to provide a desired alkalinity thereto has lead to a problem in that the sodium perborate dissolves relatively slowly in both warm and cold water as compared to sodium percarbonate. Also, such perborate based bleach compositions have a tendency to cake on standing so that they do not retain a free flowing character for a sufficiently long period of time. Further, such compositions have a tendency to separate on handling and storage whereby a dry bleach composition which originally might have sodium perborate and soda ash uniformly distributed therethroughout can eventually have a concentration of one of these products towards the bottom of a box thereof with a concentration of another of the ingredients towards the top thereof. Such separation occurs because of differences in density, differences in particle size, differences in particle shape and the like. Such separation can also occur in a bleach composition which comprises sodium percarbonate and soda ash if the composition is made by mixing together the two individual components. Further still, a composition of sodium percarbonate and soda ash made by mixing the two components together, as mentioned previously has a relatively low storage stability and exhibits a reduction in available oxygen content with time of storage which is undesirably high.

Accordingly, it is an object of the present invention to provide a powder bleach composition having the active oxygen content thereof supplied by sodium percarbonate.

It is another object of the present invention to provide a powder bleach composition which is resistant to separation.

It is a further object of the present invention to provide a powder bleach composition having sodium percarbonate therein to supply the available oxygen content thereof, which composition exhibits improved storage stability.

Yet another object of the present invention is to provide a powder bleach composition wherein substantially each particle thereof comprises both soda ash and sodium percarbonate so that separation of the composition does not occur on handling or storage.

A still further object of the present invention is to provide a sodium percarbonate powder bleach composition wherein the available oxygen content is more quickly available in solution than in prior art compositions.

Another object yet of the present invention is to provide a process for making a separation resistant dry bleach composition having the advantages stated in the above objects.

These and other objects of the present invention as will become apparent from reading the following specification are accomplished as set out herein.

SUMMARY OF THE INVENTION

In one sense the invention is concerned with a composition of matter which comprises a plurality of powder bleach particles, substantially each of which comprises soda ash and sufficient sodium percarbonate to provide from about 1 to about 6 weight percent available oxygen.

In another sense, the invention is concerned with a process for making a separation resistant powder bleach composition. The process comprises contacting particulate soda ash with sufficient of a spray of an aqueous solution of hydrogen peroxide, the contacting being at a temperature which falls within a range from about 35° C. to about 70° C. to provide a powder bleach composition having sufficient sodium percarbonate to provide from about 1 to about 6 weight percent available oxygen and a remainder of which comprises soda ash and recovering the just described dry bleach composition from the contacting step.

BRIEF DESCRIPTION OF THE DRAWING

The invention will be better understood by reference to the figures of the drawing wherein:

FIG. 1 comprises a schematic flow diagram of a process in accordance with the present invention;

FIG. 2 illustrates a plurality of dry bleach particles in accordance with the composition of matter of the present invention;

FIG. 3 illustrates an alternate schematic flow diagram of a process in accordance with the present invention; and FIG. 4 illustrates an important detail of the process embodiment of FIG. 3.

DETAILED DESCRIPTION OF THE PREFERRED EMBODIMENT

Adverting now to FIG. 1 of the drawing there is illustrated therein a process in accordance with the present invention wherein a plurality of powder bleach particles 10, as seen in FIG. 2, each of the particles comprising soda ash monohydrate 12 and sodium percarbonate 14, are produced. Generally at least some anhydrous soda ash 15 will also form a part of each particle 10, although as illustrated, some particles 10 may contain only the monohydrate 12 along with the percarbonate 14.

Soda ash, either in the form of anhydrous sodium carbonate or sodium carbonate monohydrate and preferably in the form of anhydrous sodium carbonate is loaded via a hopper 16 wherefrom it passes as represented by an arrow 18 to a continuous feeder 20 from whence it is delivered as represented by an arrow 22 to a fluid bed reactor 24. The soda ash is fluidized within the reactor 24 by air delivered to the fluid bed reactor 24 from a fan 26 as represented by an arrow 28. The air after leaving the fan 26 can also pass through a heat exchanger 30 to adjust its temperature and through a flow meter 32 to assure that the flow rate is correct. A first temperature sensor 34 checks the temperature of the air from the fan 26 while a second temperature sensor 36 is used to control the heat exchanger 30 so as to maintain the temperature of the air exiting the heat exchanger 30 at a desired value, for example 80° C. The temperature of the air entering the fluid bed reactor 24 will generally fall within a range from about 60° C. to about 140° C. and more preferably within a range from about 80° C. to about 120° C.

By proper control of air temperature, air velocity and solid and liquid reactant addition and withdrawal rates the contacting (reaction mass) temperature is maintained generally within a range from about 35° C. to about 70° C. and preferably within a range from about 38° C. to about 50° C.

In the embodiment of FIG. 1 hydrogen peroxide is introduced into the fluid bed reactor 24 as represented by a line 38. The hydrogen peroxide is introduced into the fluid bed reactor 24 via a conventional spray system represented schematically by an arrowhead 40. The entering hydrogen peroxide comprises a solution of hydrogen peroxide in water and generally comprises from about 20 to about 70 weight percent hydrogen peroxide in water. Preferably, the concentration of hydrogen peroxide will fall within a range from about 20 to about 50 weight percent. Still more preferably, the concentration of hydrogen peroxide in the hydrogen peroxide solution will fall within a range from about 25 to about 35 weight percent. While the hydrogen peroxide solution can be supplied in any manner, in the particular embodiment illustrated in FIG. 1 commercial high grade hydrogen peroxide is pumped via a pump 42 to a tank 44 wherein additional water is added as represented by an arrow 46. The hydrogen peroxide solution from the tank 44 then passes as represented by a line 48 and under the impetus of a pump 50 to a surge tank 52 from whence the solution is pumped by a pump 54 and proceeds as represented by a line 56 through a flow meter controller 58 to the aforementioned line 38 and thence to the sprayer 40.

While any of a number of fluid bed reactors may be utilized the particular type of fluid bed reactor 24 as is illustrated in FIG. 1 is one preferred embodiment. This reactor includes an air plenum 60 adjacent a bottom 61 thereof, the air plenum 60 being covered by a perforate plate 62 (generally about 2 to 7% perforation with holes generally 0.1 to 0.5 mm in diameter). The air will exit the fluid bed reactor 24 as represented by a line 64 and then pass via a damper 66 to a dust collector 68 wherein any particles contained therein will be separated and removed downwardly as represented by an arrow 70. The air within the dust collector 68 will proceed as represented by a line 72 and under the impetus of a fan 74 to be evacuated to the atmosphere. It should be noted that a majority of the water, originally introduced along with the hydrogen peroxide, will be evaporated in this manner and will leave the fluid bed reactor 24 along with the air introduced thereinto.

The velocity of the air used to fluidize the particles within the fluid bed reactor 24 is also of extreme importance. If too low of an air velocity is provided highly undesirable caking can occur leading to an inferior or even unusable product. Thus, the air velocity must be at least about 1 m/sec through the perforate plate 62. On the other hand, too high of an air velocity can be detrimental by causing high dust formation and particle erosion with concurrent grinding off of the percarbonate 14. Thus air velocities above about 2.5 m/sec should be avoided. Preferably the air velocity should fall within a range from about 1.2 m/sec to about 1.7 m/sec and most preferably within a range from about 1.4 m/sec to about 1.6 m/sec. With respect to an alternate embodiment of the process of the present invention as discussed below, it is not necessary that the minimum air velocity of at least about 1 m/sec be maintained over the entire extent of the perforate plate 62 although such rate must be maintained over at least a portion of the perforate plate 62.

The residence time of the reactants within the reactor 24 should be as short as is reasonably possible to obtain proper formation of product. Surprisingly it has been found that a residence time of as little as about 1 minute is sufficient to attain an available oxygen content of about 1% to 2% with about 95% efficient utilization of the added hydrogen peroxide. Generally the residence time should, however, be at least about 2.5 minutes and more preferably at least about 3.5 minutes to attain available oxygen contents in the 2% to 6% range. The reactants and the resultant product can be kept in the reactor 24 as long as desired but this will both lower the yield and needlessly waste energy. A preferable residence time range is 3.5 to 20 minutes with times of 4 to 10 minutes having been repeatedly used successfully and with high yields.

The hydrogen peroxide is added at a sufficient rate to assure a desired oxygen content based upon reactor capacity and the particular reactant-product residence time chosen.

The bleach product produced within the fluid bed reactor 24 will proceed therefrom as represented by an arrow 76 to a continuous tumbling mixer 78 and thence as represented by an arrow 80 to a screening apparatus 82 from whence it will proceed as represented by an arrow 84 to a storage silo 86 and thence as represented by a line 88 to packaging machinery or the like. Any lumps or overly small material removed by the screening apparatus 82 will be removed therefrom as represented by a line 90 and led off to a barrel 92 or the like.

Additional materials may be added to the dry bleach composition to improve its properties or to make it more acceptable to the ultimate user. For example perfume may be added from a perfume tank 94 as represented by an arrow 96 and surfactant may be added from a container 98 as represented by a line 100. If desired the perfume and surfactant can be premixed in a mixer 102 from whence the mixture will proceed via a pump 104, past a flow meter 106 and, as represented by an arrow 108, to the continuous tumble mixer 78. Color, whitening agent, water softening agent and the like may be added as represented by lines 110, 112 and 114 and common arrow 116 to the continuous tumble mixer 78. It is noted that while a number of ingredients may be added to the product from the fluid bed reactor 24 it is desirable that these products not be added prior to the entry of the sodium carbonate into the fluid bed reactor 24 since they would have a tendency to interfere with the reaction taking place in the fluid bed reactor 24. Other additives as are common in the art may be added to the continuous tumble mixer 78 in a like manner. For example, sodium tripolyphosphate may be added as a sequestering agent. Still further, the continuous tumble mixer 78 may have other additives added thereto to increase the stability of or otherwise modify the product. For example, sodium silicate can be added if desired to add to the stability of the product.

There are certain features which are important and indeed essential to the satisfactory practice of the process of the present invention. If these features are ignored then the resulting product will not be nearly as satisfactory for bleaching use as is the powder bleach composition of the present invention. First, it is important that the temperature be maintained within the aforesetout ranges. If lower temperatures are used there will be a tendency for sodium carbonate heptahydrate and/or decahydrate to form. This can cause caking to occur if the product is later exposed to temperatures above the temperatures at which these higher hydrates are stable. If higher temperatures are used some of the hydrogen peroxide may be decomposed before it has time to enter into the desired reaction. Further, the air velocity used to fluidize the soda ash must fall within the aforesetout range or caking and an unusable product will result from overly low air velocities or excessive abrasion and product loss from overly high air velocities.

In addition to the abovementioned features which are essential to the practice of the present invention, it is important to the practice of the present invention that the sodium carbonate which is added to the fluid bed reactor 24 as represented by the line 22, be first properly sized in accordance with the size of the desired end product. Thus it is important that a relatively small range of particle sizes be present in the sodium carbonate added to the fluid bed reactor 24. This assures that the particles 10 when they exit the fluid bed reactor 24 will all be of a relatively small range of particle sizes and in accordance with the size of the desired end product. The final product must be made up of particles within a relatively small size range so as to assure that when someone is measuring out the particles by dry measure, each volume measure will contain essentially an equal weight of the dry bleach composition. Generally, the mesh size of the entering sodium carbonate as well as the mesh size of the final product particles 10 will fall within a range from about 10 mesh to about 200 mesh and more preferably within a range from about 20 mesh to about 100 mesh.

It is also important to the present invention that the ratio of hydrogen peroxide to sodium carbonate added to the fluid reactor 24 is appropriately chosen to provide a final dry bleach composition which has sufficient sodium percarbonate to provide the desired available oxygen content, preferably from about 1 to about 6 weight percent. It is preferred that each of the particles 10 have from about 1 to about 5 weight percent available oxygen and more preferably about 2 to about 4 weight percent of available oxygen. If the available oxygen content is made too high, i.e., is made significantly above about 6%, then it will be found that the reaction mixture within the fluid bed reactor 24 will tend to cake up. Also, if the available oxygen content is above about 6 weight percent the bleach composition will have an unduly high ratio of sodium percarbonate to soda ash for the intended end usage whereby it will become necessary to add additional soda ash thereto. If this is done then problems of separation between the pure soda ash particles and the particles 10 in accordance with the present invention will result. It is preferred that the range of available oxygen content as a function of particle size falls generally within ±1 weight percent and preferably within ±0.5 weight percent of the nominal available oxygen content of the composition to eliminate settling and separation effects.

Alternate Embodiment

Adverting to FIGS. 3 and 4, there is illustrated therein an alternate embodiment of the process of the present invention which utilizes a commercial mixer-fluidized drying bed apparatus the mixer portion of which is available from Shugi and known by the trademark "Flexomix". Those portions of the diagram of FIG. 1 which are not reproduced in FIG. 3 are operatively identical. Also, the various temperatures, fluidizing velocities, etc., discussed with respect to the embodiment of FIG. 1 are the same in the embodiment of FIGS. 3 and 4. Further, the product obtained by using the embodiment of FIGS. 3 and 4 has the same advantageous properties as that of the embodiment of FIG. 1, and, indeed, the available oxygen distribution is even more uniform.

Briefly, the embodiment of FIGS. 3 and 4 differs from that of FIG. 1 in that the soda ash is delivered by the line 22 to a premix chamber 118 (The Flexomix) and the hydrogen peroxide is also delivered via a spray system 40' to the premix chamber 118. The premix chamber 118 is normally at ambient temperature and residence time of the soda ash-hydrogen peroxide premix formed therein is of the order of less than 5 seconds and usually less than about 1 second. The soda ash from the line 22 enters the premix chamber 118 via peripheral entrances 120 and the entire mixture is agitated by rotary mixing blades 122. The blades 122 force the premix outwardly against an elastomeric sleeve 124 and a plurality of rollers 126 roll up and down in contact with the outside of the sleeve 124 to force the premix down into a reactor 24' wherein the premix is converted to the powder bleach particles 10 under the previously discussed conditions of temperature, flow, etc.

In an apparatus as just discussed, it has been found that the reactor 24' can be advantageously modified as illustrated in FIG. 3. In particular, the air delivery system can be modified to provide air flow to different portions 60A and 60B of the air plemun 60. The air delivery system to the plenum portion 60a is via heat exchanger 30A as represented by an arrow 28A, etc., and a parallel air delivery system is used to the plenum portion 60B. This allows a higher temperature and a higher fluidizing velocity to be used in the leftmost portion of the reactor 24' where the premix enters and a lower temperature and a lower fluidizing velocity to be used in the rightmost (product exit) portion of the reactor 24'. Particularly good results have been obtained with a temperature of about 96° C. and a fluidizing velocity of about 1.3 m/sec through the perforate plate 62 above the plenum portion 60A and a temperature of about 81° C. and a fluidizing velocity of about 0.84 above the plenum portion 60B. Thus, an additional step of fluidizing is provided at a reduced gas velocity which falls within a range from about 0.5 to about 1.5 m/sec and at a temperature from about 60° C. to about 120° C. It will be noted that after fluidizing at an air velocity of at least about 1 m/sec (1.3 m/sec) above the plenum portion 60A, milder temperatures and lower flow rates can be utilized for the additional fluidizing above the plenum portion 60B thus reducing dust formation and particle erosion.

The invention will be better understood by reference to the following examples.

trolled, constant temperature/relative humidity storages. Following are the results of these side-by-side stability tests.

|  | % of Initial Available Oxygen After Two Months | | |
|---|---|---|---|
|  | 56°–90° F./36–92% R.H. | 90° F./85% R.H. | 120° F./20% R.H. |
| Dry Blend Product | 74.1 | 68.5 | 55.8 |
| New Process Product | 80.7 | 78.3 | 57.1 |

[a]Sodium percarbonate produced by Food Machinery Corporation, U.S.A., initial available oxygen content of mixture = 3.94%
[b]Product of the present invention, initial available oxygen content of mixture = 4.29%

EXAMPLE 1

This example demonstrates the production of a powder bleach in accordance with the FIG. 1 embodiment of the present invention.

Anhydrous soda ash was fed into a fluidized bed reactor at the rate of 266 kg/hr. Heated air (93° C.) was used at an air velocity of 1.17 m/sec across the bed to fluidize the reaction mass and to keep the reaction mass at 42±7° C. 35% $H_2O_2$ was sprayed on the fluidized bed of soda ash at the rate of 84.5 kg/hr. The residence time within the reactor was about 10 minutes. The product was collected at the rate of 318 kg/hr. The production run continued for 80 minutes. The final product had 3.81% of available oxygen.

EXAMPLE 2

This example illustrates the formation via the FIG. 1 process of the present invention of additional product in accordance with the present invention using conditions as follows:

| Soda ash feed rate | 629 kg/hr. |
|---|---|
| 35% Hydrogen peroxide | 192 kg/hr. |
| Air velocity | 1.5 m/sec. |
| Residence time | 4.6 minutes |
| Air temperature | 88.7° C. |
| Reaction mass temperature | 47.8° C. |
| Production rate | 775 kg/hr. |
| Available oxygen | 3.95% |
| Production run | 3 hours |

EXAMPLE 3

A product was produced in accordance with the FIG. 1 embodiment of the present invention and tested for storage stability. A prior art product was produced by blending together commercial (15% available oxygen) sodium percarbonate with anhydrous soda ash. An identical storage test was performed for comparison on the prior art composition. The original available oxygen contents were substantially the same. The two different products were stored side-by-side for two months under three different temperature/relative humidity conditions. The first of such conditions was an uncontrolled temperature/relative humidity twice daily monitored storage; the second and third conditions were con-

EXAMPLE 4

A series of experiments were performed to determine the relative rates of availability of oxygen in solution of a product produced in accordance with FIG. 1 of the present invention and a mixture of commercial sodium percarbonate (13.5% to 14% available oxygen) and sodium carbonate. The experiments were run as follows: All components were sieved to form a 30 to 40 mesh fraction and thereby standardize the particle gross surface area. While 90 ml of deionized water at 25° C. was stirred at a moderate pace, 10 grams of the appropriate sample was rapidly added. After 0.5, 1, 5 and 12 minutes, 5.0 ml aliquots were removed and immediately added to 20 ml of 5% sulfuric acid. The resulting solutions were each titrated with a standardized permanganate solution. The oxygen contents in the aliquots were then calculated relative to the total amount present applying proper correction factors to compensate for concentration changes during the course of the experiment.

The results are summarized as follows:

|  |  | Relative Available Oxygen % | |
|---|---|---|---|
| Aliquot No. | Sampling Time, Minutes | Commercial[a] Mixture[a] | Present[b] Product[b] |
| 1 | 0.5 | 53 | 100 |
| 2 | 1.0 | 88 | 101* |
| 3 | 5.0 | 98 | 99 |
| 4 | 12.0 | 92 | 94 |

*Equal to 100 within experimental error.
[a]Peroxid Chemi GMBH, Werk Honningen, West Germany, available oxygen content of mixture = 3.19%
[b]Product of the present invention, available oxygen content = 3.37%

This example demonstrates quicker availability of oxygen in solution with a product in accordance with the present invention thus potentially increasing effective bleaching time during a wash cycle.

EXAMPLE 5

A series of experiments were performed to determine the distribution of available oxygen as a function of particle size for a product produced in accordance with FIG. 1 of the present invention, a product produced in accordance with FIGS. 3 and 4 of the present invention and a mixture of commercial (13.5% to 14% available oxygen) sodium percarbonate and sodium carbonate. The samples were sieved and an available oxygen analysis was performed for each separate fraction. The results are summarized as follows:

| U.S. Standard Mesh | Commercial Mixture[a] Weight % | Commercial Mixture[a] % Available Oxygen | Product per FIG. 1[b] Weight % | Product per FIG. 1[b] % Available Oxygen | Product per FIGS. 3 and 4[c] Weight % | Product per FIGS. 3 and 4[c] % Available Oxygen |
| --- | --- | --- | --- | --- | --- | --- |
| 20 | 0.20 | — | 0.07 | — | 2.01 | 3.78 |
| 30 | 5.95 | 11.84 | 1.63 | 1.91 | 8.16 | 3.65 |
| 40 | 14.9 | 8.97 | 16.65 | 2.72 | 28.6 | 3.60 |
| 50 | 27.9 | 2.97 | 40.0 | 3.79 | 35.8 | 3.49 |
| 70 | 31.4 | 0.79 | 23.9 | 3.70 | 18.6 | 3.60 |
| 100 | 15.2 | 0.53 | 10.6 | 3.67 | 5.7 | 3.68 |
| 140 | 3.05 | 0.46 | 3.44 | 3.71 | 1.03 | 3.96 |
| 200 | 0.64 | 0.54 | 1.63 | 5.57 | 0.11 | — |
| Through 200 | 0.76 | 0.93 | 2.08 | 10.05 | — | — |
|  | 100.0% |  | 100.0% |  | 100.0% |  |

[a]Peroxid GMBH, Werk, Honningen, West Germany, available oxygen content of mixture = 3.23%
[b]Product of FIG. 1 of the present invention, available oxygen content = 3.69%
[c]Product of FIGS. 3 and 4 of the present invention, available oxygen content = 3.58%

This example demonstrates the extremely good uniformity of available oxygen (sodium percarbonate) over a wide particle size range for a product in accordance with the present invention whether made by the process illustrated in FIG. 1 or in FIGS. 3 and 4. The example also illustrates relatively poor uniformity of available oxygen with particle size of a simple sodium percarbonate-sodium carbonate mixture. It should be noted that about 50% of the commercial product demonstrated overly high available oxygen contents (30–50 mesh) which could lead to overbleaching while the other about 50% thereof (the through 50 mesh portion) demonstrated very low available oxygen content which would be ineffective or at best only partially effective in providing bleaching action. Separation of particles by size during shipment and storage could thus lead to large (overbleaching) particles predominating in measures removed from a freshly opened box and small (ineffective) particles predominating in measures removed from the bottom of the box.

EXAMPLE 6

A series of experiments were performed to determine pour characteristics, lumping and caking formation after storage for both a product in accordance with FIG. 1 of the present invention and a mixture of commercial (15% available oxygen) sodium percarbonate with anhydrous soda ash. The three different storage conditions were as in example 3; storage was for 2 months. The below indicated values represent the average of a pour grade, a lump grade and a caking grade.

Pour, lump and caking grades were evaluated on a scale of 1–10 with higher numbers indicating more desirable properties (easier pouring, less lumping, less caking). Any ranking of 7 or above is considered acceptable for consumer use.

For the pour test, a scale value of 10 represents even, continuous flow; a scale value of 8 represents partial blockage of carton opening with continuous flow.

For the lump test, a scale value of 10 represents no lumps visible in the poured product; a scale value of 8 represents visible lumps after shaking which cannot be picked up with the fingers. Each pour was made at a 45° angle 4 inches over a 2 foot square section of cardboard.

For the caking test, a scale value of 10 represents no lumps, free flowing product of which 100% will pass freely through a ½" screen; a scale value of 8 represents compacted, but easily dispensible of which 100% will pass freely through a ½" screen. The caking test consisted of pouring an aliquot of the test material onto a ½" screen.

| Pour/Lump/Caking/Grade Average Temp/R.H. conditions | 1 | 2 | 3 |
| --- | --- | --- | --- |
| Dry Blend Product[a] | 10 | 10 | 10 |
| New Process Product[b] | 8.3 | 9.9 | 10 |
| Commercial Perborate Product[c] | 7.8 | 9.0 | 1 |

[a]Food Machinery Corporation, U.S.A., initial available oxygen content of mixture = 3.94%
[b]Product of FIG. 1 of the present invention, initial available oxygen content of mixture = 4.29%
[c]Blend of nominally 36% sodium perborate tetrahydrate, 63.5% sodium carbonate (anhydrous) plus minor amounts of brightener, bluing, fragrance, deduster; initial available oxygen content of mixture = 3.88%

This example demonstrates the excellent pour characteristics and low degree of lump and caking formation for a product of the invention subjected to relatively severe storage conditions. Although the otherwise unacceptable dry blend product shows a slight advantage in this area, the product of the present invention is significantly better than the normal commercial (perborate) product which is itself fully commercially acceptable.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A process for making a separation resistant dry bleach composition, comprising:
   contacting particulate soda ash with sufficient of a spray of an aqueous solution of hydrogen peroxide, said contacting being at a temperature which falls within a range from about 35° C. to about 70° C. to provide a dry bleach composition having sufficient sodium percarbonate to provide available oxygen in an amount of from about 1 to about 6 weight percent of said composition and a remainder which comprises soda ash; and
   recovering said dry bleach composition from said contacting step.

2. A process as in claim 1, wherein said contacting comprises fluidized bed contacting in the presence of a fluidizing gas stream at a gas velocity which falls within a range from about 1 m/sec to about 2.5 m/sec for a time of at least about 1 minute.

3. A process as in claim 2, wherein said aqueous solution is from about 20 to about 70 weight percent hydrogen peroxide.

4. A process as in claim 2, wherein said aqueous solution is from about 25 to about 35 weight percent hydrogen peroxide.

5. A process as in claim 2, wherein said aqueous solution is from about 20 to about 50 weight percent hydrogen peroxide.

6. A process as in claim 5, wherein said particulate soda ash consists of sodium carbonate monohydrate, anhydrous sodium carbonate or a mixture thereof.

7. A process as in claim 6, wherein said particulate soda ash comprises anhydrous sodium carbonate.

8. A process as in claim 6, wherein said soda ash in said product comprises sodium carbonate monohydrate.

9. A process as in claim 8, wherein said contacting temperature falls within a range from about 35° C. to about 50° C.

10. A process as in claim 8, wherein substantially each of said particles has from about 2 to about 4 weight percent available oxygen.

11. A process as in claim 10, wherein said particulate soda ash is from about 10 to about 200 mesh in size.

12. A process as in claim 10, wherein the mesh size of said particulate soda ash is from about 20 to about 100 mesh.

13. A process as in claim 1, wherein said product comprises a plurality of product particles, substantially each of said particles having from about 1 to about 5 weught percent available oxygen.

14. A process as in claim 1, wherein said contacting comprises:
precontacting said soda ash and said hydrogen peroxide spray in a premixer to form a premix composition; and
fluidizing said premix composition in a fluidized bed in the presence of a fluidizing gas stream at a gas velocity which falls within a range from about 1 m/sec to about 2.5 m/sec and at a temperature which falls within a range from about 35° C. to about 70° C. for a time of at least about 1 minute.

15. A process as in claim 14, wherein said aqueous solution is from about 20 to about 70 weight percent hydrogen peroxide.

16. A process as in claim 14, wherein said aqueous solution is from about 25 to about 35 weight percent hydrogen peroxide.

17. A process as in claim 14, wherein said aqueous solution is from about 20 to about 50 weight percent hydrogen peroxide.

18. A process as in claim 17, wherein said particulate soda ash consists of sodium carbonate monohydrate, anhydrous sodium carbonate or a mixture thereof.

19. A process as in claim 18, wherein said particulate soda ash comprises anhydrous sodium carbonate.

20. A process as in claim 18, wherein said soda ash in said product comprises sodium carbonate monohydrate.

21. A process as in claim 20, wherein substantially each of said particles has from about 2 to about 4 weight percent available oxygen.

22. A process as in claim 21, wherein the mesh size of said particulate soda ash is from about 20 to about 100 mesh.

23. A process as in claim 21, wherein said particulate soda ash is from about 10 to about 200 mesh in size.

24. A process as in claim 20, wherein said contacting temperature falls within a range from about 35° C. to about 50° C.

25. A process as in claim 14, wherein substantially each of said particles has from about 1 to about 5 weight percent available oxygen.

26. A process as in claim 14, wherein said fluidizing is by air preheated to a temperature which falls within a range from about 60° C. to about 140° C.

27. A process as in claim 26, including as an added step after said fluidizing:
additionally fluidizing the product of said fluidizing step at a reduced gas velocity within a range from about 0.5 m/sec to about 1.5 m/sec, the air for said additional fluidizing being preheated to a temperature within a range from about 60° C. to about 120° C.

28. A composition of matter, comprising:
a plurality of dry bleach particles, substantially each of said particles comprising soda ash and sufficient sodium percarbonate to provide about 1 to about 6 weight percent available oxygen.

29. A composition of matter as in claim 28, wherein said soda ash comprises sodium carbonate monohydrate.

30. A composition of matter as in claim 29, wherein said soda ash further comprises anhydrous sodium carbonate.

31. A composition of matter as in claim 28, wherein the amount of said available oxygen falls within a range from about 2 weight percent to about 4 weight percent.

32. A composition of matter as in claim 28, wherein said particles fall generally within a range from about 10 mesh to about 200 mesh.

33. A composition of matter as in claim 28, wherein said particles are of a size to fall within a range from about 20 mesh to about 100 mesh.

* * * * *